3,649,717
SYNTHETIC HIGH POLYMERS HAVING A PARTICULAR RECEPTIVITY TO DYES, AND PROCESS FOR THEIR PREPARATION
Cornelio Caldo, Terni, Italy, assignor to Montecatini Edison S.p.A., Milan, Italy
No Drawing. Filed June 15, 1970, Ser. No. 46,509
Claims priority, application Italy, June 18, 1969, 18,311/69
Int. Cl. C08f 29/12
U.S. Cl. 260—897 B
6 Claims

ABSTRACT OF THE DISCLOSURE

Dye receptive compositions comprising crystalline polyolefins and about 1 to 25% by weight of the composition of polymeric tinctorial modifier consisting of or containing repeating units of the formula

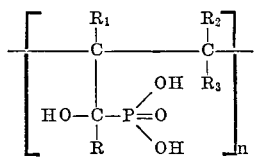

wherein each of R, $R_1$, $R_2$ and $R_3$ is selected from the group consisting, of H, alkyl and phenyl, and $n$ is a number from about 10 to 1000.

Compositions are particularly useful for textile fibers and are particularly receptive to basic dyestuffs.

Tinctorial modifiers are obtained by reacting polymers containing carbonyl repeating units with $PCl_3$ and subsequent hydrolysis in acid medium.

BACKGROUND OF THE INVENTION

(1) Field of the invention

The present invention relates to dye-receptive crystalline polyolefin compositions which are particularly suitable for the preparation of textile fibers as well as films, strips, and other manufactured articles, and which are particularly receptive towards various classes of dyestuffs, especially basic and basic-cationic dyestuffs.

More particularly, this invention relates to dye-receptive compositions and to the preparation of dyeable textile fibers by the extrusion of such compositions, these compositions comprising mixes of olefin polymers with polymers consisting of or containing in their polymeric chain repeating units of the type:

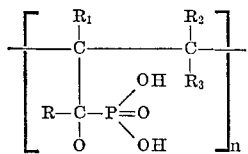

wherein R, $R_1$, $R_2$ and $R_3$ are hydrogen atoms, alkyl groups, preferably methyl groups, or phenyl groups, and $n$ is a number from about 10 to 1000.

(2) Description of the prior art

The tinctorial modification of polyolefins and in particular crystalline polypropylene by adding compounds which are receptive to basic dyes has been the object of various patents. Thus, there have been claimed additives consisting of compounds containing carboxylic acid groups (German Pat. 1,106,450 and British Pat. 904,798), compounds containing sulfonic acid groups (British Pats. No. 639,567 and No. 902,587) and phosphoric acid derivatives such as polyphosphonitrilic halides and phosphochlorinated polymers (Italian Pat. 649,673).

The modification of polypropylene with such additives has only a limited efficacy, however, both because of the tendency towards thermal decomposition of many of the additives, in particular of those containing carboxylic acid groups, under the conditions employed in the transformation of the polymer compositions into fibers, and as regards the receptivity of the resulting products to basic dyestuffs, which, for many additives, is not commercially acceptable.

SUMMARY OF THE INVENTION

It has now surprisingly been found that textile fibers which are satisfactorily dyeable with basic and basic-cationic dyestuffs may be obtained by spinning mixes comprising crystalline olefin polymers admixed with polymers consisting of or containing in their polymeric chain structural units of the following type:

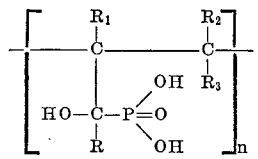

wherein R, $R_1$, $R_2$ and $R_3$ are each selected from the group consisting of hydrogen, alkyl and phenyl, and $n$ is a number from about 10 to 1000. The preferred alkyl is methyl.

The additives of the present invention provide good receptivity towards basic and basic-cationic dyestuffs and are thermally stable under the operational conditions employed for spinning of textile fibers from the compositions of the present invention.

Accordingly, the present invention provides a polymeric tinctorial modifier consisting of, or containing in its polymeric chain, repeating units having the structure.

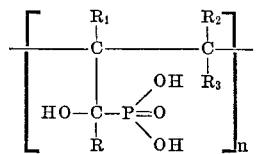

wherein R, $R_1$, $R_2$ and $R_3$ are each selected from the group consisting of hydrogen, alkyl and phenyl, and $n$ is a number from about 10 to 1000.

The present invention also provides a dye-receptive composition comprising (1) a crystalline polymer of an olefin having the formula $R—CH=CH_2$ wherein R is selected from the group consisting of H, an alkyl having from about 1 to 10 carbon atoms, and a phenyl having from about 6 to 10 carbon atoms, and (2) from about 1 to 25% by weight, based on the weight of the composition, of a polymeric tinctorial modifier as defined above.

The invention further provides textile fibers and other manufactured articles comprising a dye-receptive composition as defined above.

DESCRIPTION OF THE PREFERRED EMBODIMENTS

The tinctorial modifiers of the present invention are obtained through the reaction of homopolymers and copolymers containing carbonyl groups with $PCl_3$, and subsequent hydrolysis in an acid medium, according to the method described in C. S. Marvel & J .C. Wright, Jour. of Polym. Science, 8, No. 5, page 495 (1952).

Suitable for use in the reaction with $PCl_3$ are styrene/methylvinylketone copolymers, butadiene/methylvinylketone copolymers, methylvinylketone/methacrylate copolymers, methylmethacrylate/methylvinylketone copolymers, butylacrylate/methylvinylketone copolymers, acrylonitrile/methylvinylketone copolymers, styrene/methacrolein copolymers, styrene/cinnamic aldehyde copolymers, styrene/methyl isopropenylketone copolymers, styrene/benzolacetone copolymers, styrene/benzalacetophenone copolymers and the like, and homopolymers of the aforementioned monomers, for example, polymethylvinylketone and the like. All these homopolymers and copolymers are obtained by polymerization in solvents, according to known methods. At the end of the polymerization, the homopolymers and copolymers, dissolved in the solvent, are reacted directly (i.e., without first isolating them) with $PCl_3$, after first removing any possible unconverted monomer.

The reaction with $PCl_3$ proceeds at room temperature, and is preferably carried out at a temperature between about 20° and 30° C., for a reaction time of from about 1 to 50 hours.

Thereafter, hydrolysis is effected by adding an acid to the resulting solution. Glacial acetic acid is the preferred acid. The hydrolysis reaction may be conducted at temperatures ranging from 15° to 30° C. for from about 1 to 50 hours. Thereafter, the resulting mixture is poured into water at 15° to 30° C. The polymer which is thereby precipitated is filtered, washed with water and finally dried. The drying may be performed at temperatures between 40° and 110° C., under ordinary or reduced pressure, and preferably at 50°–60° C. under a residual pressure of 15–20 mm. Hg.

The polymerization and the reaction of the polymers with $PCl_3$ are carried out in organic solvents, preferably in hydrocarbon solvents such as, for example, benzene, toluene and xylene, or in other solvents such as dioxane, chloroform and the like.

In accordance with the present invention, the homopolymers and copolymers thus obtained are added to polyolefins, preferably to polyolefins consisting essentially of isotactic macromolecules obtained by means of a low pressure polymerization with stereo-specific catalysts, in an amount of from about 1% to 25% by weight based on the weight of the total composition.

Preferred crystalline polyolefins include polypropylene homopolymers consisting essentially of isotactic macromolecules (obtained through stereospecific polymerization of propylene, according to the process disclosed in British patent specification No. 810,023) and copolymers of propylene with ethylene having with a predominant propylene content, and having a substantially crystalline structure. More generally, suitable polyolefins for use in the compositions of the present invention include the crystalline polyolefins obtained from monomers of the formula $R-CH=CH_2$, wherein R is H, alkyl or phenyl. These monomers include, for example, ethylene, butene-1, 4-methyl pentene-1, pentene-1, hexene-1, octene-1, styrene and the like.

The addition of the polymeric tinctorial modifier to the olefin polymer in accordance with the present invention is, in general, carried out by simply admixing the two materials in powder form. It is, however, also possible to carry out the addition by means of other methods such as the mixing of the olefin polymer with a solution of the additive in a suitable solvent, this admixture being then followed by the evaporation of the solvent itself. Also, the additive may be added to the olefin polymerization mass during or at the end of the polymerization of the olefins.

For the preparation of the yarns, the mixes are first granulated and then extruded through known melt-spinning devices, operating in the absence of oxygen, preferably in an inert gas atmosphere (e.g.: nitrogen), substantially as has been described by M. Compostella for polypropylene in the article of "The Stereochemistry of Macromolecules," vol. 1, Chapter 6, pp. 336–343.

During the mixing, there may also be added to the polymers pigments, organic or inorganic dyestuffs, stabilizers, lubricants, dispersing agents and the like, as is known in the art.

The yarns, after spinning, may be subjected to a stretching operation with stretch ratios between about 1:2 and 1:20, at temperatures between about 80° and 150° C., in stretching devices heated with hot air, steam or any other suitable hot fluid, or heated by means of properly mounted heating plates. Alternatively, the yarns may be subjected to a pronounced orientation after extrusion, and to dimensional stabilization (sizing) treatment, under free or hindered shrinkage, at a temperature of from about 80° to 160° C., as described in U.S. Pat. No. 3,106,442.

The spinning may be carried out on conventional spinnerets but preferably on spinnerets having a diameter greater than 0.5 mm. and a length/diameter ratio greater than 1.1 and preferably between about 10 and 30. The holes of the spinnerets may have either a circular or a non-circular cross-section.

The dyeable compositions of the present invention may also form either the inside part of a bi-component fiber or the outside lining of such a fiber.

The yarns that are obtained by the extrusion of the mixes (dyeable compositions) of the present invention may be either mono- or plurifilament yarns and may be used for the preparation of bulk yarns or tops and for the preparation of spun bonded and non-woven structures in general.

The compositions of this invention may also be used for the preparation of films, strips, and other manufactured objects.

While the foregoing description of the present invention has been with reference to blends of olefins polymers, and dye-receptive fibers and other products made therefrom, the invention may also be applied to other polymers, particularly other fiber-forming polymers, e.g., acrylic, vinyl, polyamide, and polyester polymers and the like.

The dye-receptive compositions of the present invention, particularly in the form of fibers, display an excellent receptivity towards dyestuffs, in particular to dyestuffs of the basic and basic-cationic as well as of the disperse classes; and the dyed fibers have good light fastness, as well as good resistance to wahing and to abrasion.

The dye-receptive compositions of the present invention may be dyed with basic or basic-cationic dyes in accordance with conventional dyeing methods, such as those disclosed in British patent specification No. 1,609,651. However, it is preferable to precede the dyeing step with a preliminary purging treatment with aqueous alkali solutions at temperatures between about 20° and 100° C. for from about 1 minute to 4 hours.

Dyes which are suitable for use with the compositions of the present invention are, for example, Astrazon Yellow 3G (C.I. Basic Yellow 11), Deorline Yellow 5 GL (C.I. Basic Yellow 13), Astrazon Orange R (C.I. Basic Orange 22), Sevron Brilliant Red 4G (C.I. Basic Red 14), Deorline Green JJO (C.I. Basic Green 1), Genacryl Red 6B (C.I. Basic Violet 7), Genacryl Pink G (C.I. Basic Red 13), Astrazon Blue G (C.I. Basic Blue 1), Astrazon Red 6B (Basic Violet 7), Deorline Violet 5B.

The following examples are presented to further illustrate the present invention.

EXAMPLE 1

Preparation of the modifier

Into a three-necked, 2-liter flask provided with a stirrer, a thermometer, a reflux condenser, a gas feeding tube for the introduction of nitrogen, and a funnel, and immersed in a liquid heating bath, there were introduced 500 cc. of toluene, 250 g. of styrene, 250 g. of methylvinylketone, and 3 g. of azo-bis-isobutyronitrile (polymerization catalyst).

The addition of the monomers was carried out after the solvent had reached the polymerization temperature. The polymerization was conducted at 78° C. for 10 hours, in an atmosphere of nitrogen. The temperature of the mixture was then adjusted to 25° C. and 250 cc. of $PCl_3$ were then added, during 45 minutes, after having connected the flask to a bottle containing a 10% solution of sodium hydroxide for absorption of the HCl which develops during the reaction.

Once the addition of the $PCl_3$ had been completed, the reaction was continued for 12 hours, at the end of which time the elimination of the HCl was complete. Thereupon there were added 1000 cc. of glacial acetic acid and the mixture was then stirred for 12 additional hours at 25° C. The mixture was then poured into 5 liters of water. The phosphonic acid derivative of the copolymer was thereby precipitated in the form of a white powder. It had a phosphorus content of 2.7% by weight.

Preparation of the modified fibers 500 g. of the thus obtained phosphonic acid derivative were mixed together with 9.5 kg. of isotactic polypropylene (melt index=18; ash content=0.001%; residue after heptane extraction=97%).

The mixture was then extruded at 210° C. to form a granulate, which was then transformed into fibers under the following operating conditions:

Spinning:
  worm-screw temperature: 250° C.
  temperature of extruding head: 250° C.
  temperature of the spinneret: 250° C.
  spinneret type: 60 holes, each having a diameter of 0.8 mm. and 16 mm. length.
  maximum pressure: 39 kg./cm.$^2$
  winding speed: 500 m./min.
Stretching:
  temperature: 130° C.
  medium: steam
  stretch ratio: 1:4.

The fibers thus obtained showed a good affinity towards the following basic dyes, after treatment for 1 hour at 25° C. with a 10% solution of sodium hydroxide.

Deorline Yellow 5GL (C.I. Basic Yellow 13)
Astrazone Orange R (C.I. Basic Orange 22)
Deorline Green JJO (C.I. Basic Green 1)
Deorline Violet SB

EXAMPLE 2

Preparation of the modifier

Into a three-necked, 2-liter flask, fitted with a stirrer, and provided with a thermometer, a reflux condenser, a nitrogen feeding tube and a funnel, and immersed in a liquid heating bath, there were introduced 500 cc. of toluene, 250 g. of methylmethacrylate, 250 g. of methylvinylketone and 3 g. of azo-bis-isobutyronitrile.

The addition of the monomers was carried out after the solvent had reached the polymerization temperature. The polymerization was conducted at 75° C. for 10 hours in a nitrogen atmosphere.

The temperature of the mixture was then adjusted to 25° C. and 250 cc. of $PCl_3$ were then added, during 60 minutes, after having connected the flask to a bottle containing a 10% solution of sodium hydroxide for absorption of the HCl which forms during the reaction.

After the addition of the $PCl_3$ had been completed, the reaction was continued for 12 hours at the end of which time the elimination of the HCl was complete. Thereupon there were added 1000 cc. of glacial acetic acid, and the mixture was then stirred for 12 more hours at 25° C., whereupon the mixture was poured into 5 liters of water. The phosphonic acid derivative of the copolymer was thereby precipitated in the form of a white powder. It had a phosphorus content of 2.8%.

Preparation of the modified fiber 500 g. of the thus obtained phosphonic acid derivative were mixed together with 9.5 kg. of isotactic polypropylene (melt index=18; ash content=0.001%; residue after heptane extraction=97%).

The mixture was then extruded at 210° C. to obtain a granulate which was then converted into fibers under the following operating conditions:

Spinning:
  wormscrew temperature: 250° C.
  temperature of extruding head: 250° C.
  temperature of spinneret: 250° C.
  spinneret type: 60 holes, each of 0.8 mm. diameter and 16 mm. length.
  maximum pressure: 41 kg./cm.$^2$
  winding rate: 500 m./min.
Stretching:
  temperature: 130° C.
  medium: steam
  stretch ratio: 1:4.

The resulting fibers showed a good affinity towards the following basic dyes, after treatment with a 10% solution of sodium hydroxide for 1 hour at 25° C.

Deorline Yellow 5GL (C.I. Basic Yellow 13)
Astrazone Orange R (C.I. Basic Orange 22)
Deorline Green JJO (C.I. Basic Green 1)
Deorline Violet 5B

EXAMPLE 3

Preparation of the modifier

Into a three-necked, 2-liter flask provided with a thermo-meter, a stirrer, a reflux condenser, a nitrogen feeding tube and a funnel, and immersed in a heating bath, there were introduced 500 cc. of toluene, 250 g. of butylacrylate, 250 g. of methylvinylketone and 3 g. of azo-bis-isobutyronitrile.

The addition of the monomers was carried out after the solvent had reached polymerization temperature. The polymerization was conducted for 1 hour at 80° C. in a nitrogen atmosphere.

The temperature of the resulting reaction mixture was then adjusted to 25° C., and 250 cc. of $PCl_3$ were then added, during 50 minutes, after having connected the flask to a bottle containing a 10% solution of sodium hydroxide for absorbing the HCl that develops during the reaction.

After the addition of $PCl_3$ had been completed, the reaction was continued for 12 hours until all the HCl had been eliminated. Thereupon, 1000 cc. of glacial acetic acid were added to the reaction mixture and the resulting mixture was kept under stirring for another 12 hours at 25° C. At the end of this period, the mixture was poured into 5 liters of water. The phosphonic acid derivatives of the copolymer was thereby precipitated as a white powder. The phosphorus content thereof was 1.9%.

Preparation of the modified fiber 500 grams of the thus obtained phosphonic acid derivative were admixed with 9.5 kg. of polypropylene (having a melt index of 18; an ash content of 0.001%; and a residue after heptane extraction of 97%).

The mixture was extruded at 210° C. and the thus obtained granulate was transformed into fibers under the following operating conditions:

Spinning:
  worm-screw temperature: 250° C.
  temperature of extruding head: 250° C.
  temperature of spinneret: 250° C.
  spinneret type: 60 holes, each of 0.8 mm. diameter and 16 mm. length.
  maximum pressure: 34 kg./cm.$^2$
  winding rate: 500 m./min.

Stretching:
    temperature: 130° C.
    medium: steam
    stretch ratio: 1:4.

The fibers thus obtained showed good affinity towards the following basic dyes, after treatment with a 10% solution of sodium hydroxide for 1 hour at 25° C.

Deorline Yellow 5GL (C.I. Basic Yellow 13)
Astrazone Orange R (C.I. Basic Orange 22)
Deorline Green JJO (C.I. Basic Green 1)
Deorline Violet 5B

EXAMPLE 4

Preparation of the Modifier

Into a three-necked, 2-liter flask provided with a stirrer, a thermometer, a reflux condenser, a nitrogen feeding tube and a funnel, and immersed in a heating bath, there were introduced 500 cc. of toluene, 250 g. of styrene, 250 g. of methylisopropenylketone and 3 g. of azo-bis-isobutyronitrile.

The addition of the monomers was carried out after the solvent had reached polymerization temperature. The polymerization was conducted at 75° C. for 12 hours in a nitrogen atmosphere.

The temperature of the resulting mixture was then adjusted to 25° C., and 250 cc. of $PCl_3$ were then added, during 50 minutes, after having connected the flask to a bottle containing a 10% solution of sodium hydroxide for absorbing the HCl that is generated during the reaction.

After the addition of the $PCl_3$ had been completed, the reaction was continued for 12 hours, until all the HCl had been eliminated. Thereupon, there were added 1000 cc. of glacial acetic acid and the mixture was kept under stirring for another 12 hours at 25° C. Thereafter, the mixture was poured into 5 liters of water. The phosphonic acid derivative of the copolymer which was thereby precipitated as a white powder had a phosphorus content of 1.5%.

Preparation of the modified fibers 500 grams of the thus obtained phosphonic acid derivative were admixed with 9.5 kg. of polypropylene (having a melt index of 18; an ash content of 0.001%; and a residue after heptane extraction of 97%).

The mixture was then extruded at 210° C. and the thus obtained granulate was converted into fibers under the following operating conditions:

Spinning:
    worm-screw temperature: 250° C.
    temperature of extruding head: 250° C.
    temperature of spinneret: 250° C.
    spinneret type: 60 holes, each of 0.8 mm. diameter and 16 mm. length.
    maximum pressure: 45 kg./cm.²
    winding speed: 500 m./min.
Stretching:
    temperature: 130° C.
    medium: steam
    stretch ratio: 1:4.

The fibers thus obtained showed good affinity towards the following basic dyes after treatment with a 10% solution of sodium hydroxide for 1 hour at 25° C.

Deorline Yellow 5GL (C.I. Basic Yellow 13)
Astrazone Orange R (C.I. Basic Orange 22)
Deorline Green JJO (C.I. Basic Green 1)
Deorline Violet 5B

EXAMPLE 5

500 g. of the phosphonic acid derivative obtained as described in Example 1 were admixed with 9.5 kg. of an ethylene/propylene copolymer (having an ethylene/propylene molar ratio of 2/98; a melt index of 6; an ash content of 0.005%; and a residue after heptane extraction of 94%).

The mixture was then extruded at 220° C. and the granulate thus obtained was transformed into fibers under the following operating conditions:

Spinning:
    worm-screw temperature: 260° C.
    temperature of extruding head: 265° C.
    temperature of spinneret: 260° C.
    spinneret type: 60 holes, each of 0.8 mm. diameter and 16 mm. length.
    maximum pressure: 54 kg./cm.²
    winding speed: 500 m./min.
Stretching:
    temperature: 130° C.
    medium: steam
    stretch ratio: 1:4.

The fibers thus obtained showed good affinity towards the following basic dyes after a treatment with a 10% solution of sodium hydroxide for 1 hour at 25° C.

Deorline Yellow 5GL (C.I. Basic Yellow 13)
Astrazone Orange R (C.I. Basic Orange 22)
Deorline Green JJO (C.I. Basic Green 1)
Deorline Violet 5B Variations can of course be made without departing from the spirit and scope of the invention.

Having thus described the invention, what it is desired to secure by Letters Patent and is hereby claimed is:

1. A dye-receptive composition comprising (1) from about 75 to 99% by weight of a crystalline polymer of an olefin having the formula R—CH=CH₂ wherein R is selected from the group consisting of H, an alkyl having from about 1 to 10 carbon atoms, and a phenyl having from about 6 to 10 carbon atoms, and (2) from about 1 to 25% by weight of a polymeric tinctorial modifier consisting essentially of repeating units having the structure

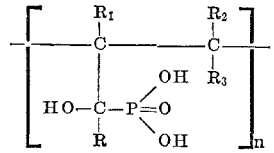

wherein R, $R_1$, $R_2$, and $R_3$ are each selected from the group consisting of H, an alkyl having from about 1 to 10 carbon atoms, and a phenyl having from about 6 to 10 carbon atoms, and $n$ is a number from about 10 to 1000.

2. The composition of claim 1 wherein the tinctorial modifier is the product of hydrolyzing the reaction product of $PCl_3$ with a polymer selected from the group consisting of a homopolymer of an unsaturated carbonyl monomer selected from the group consisting of methacrolein, cinnamic aldehyde, methylvinylketone, methylisopropenylketone, benzalacetone and benzalacetophenone and a copolymer of an unsaturated carbonyl monomer selected from the group consisting of methacrolein, cinnamic aldehyde, methylvinylketone, methylisopropenylketone, benzalacetone and benzalacetophenone with another monomer copolymerizable therewith and selected from the group consisting of said carbonyl monomers, styrene, butadiene, methylacrylate, methylmethacrylate, and acrylonitrile.

3. The composition of claim 1 which contains from about 2 to 10% by weight of said tinctorial modifier.

4. The composition of claim 1 wherein said olefin polymer is selected from the group consisting of polypropylene consisting essentially of isotactic macromolecules and a crystalline copolymer of propylene and ethylene, said copolymer containing a preponderance of repeating units derived from propylene.

5. Textile fibers comprising the composition of claim 1.
6. Textile fibers comprising the composition of claim 4.

References Cited

UNITED STATES PATENTS 3,367,996  2/1968  Strauss et al. -------- 260—887
3,437,719  4/1969  Zutty et al. --------- 260—897

MURRAY TILLMAN, Primary Examiner

C. J. SECCURO, Assistant Examiner

U.S. Cl. X.R.

8—180; 260—63 N, 63 BB, 63 R, 67 UA, 73 R, 874, 897 R, 41 C; 264—78, 210

PO-1050
(5/69)

UNITED STATES PATENT OFFICE
CERTIFICATE OF CORRECTION

Patent No. 3,649,717                    Dated March 14, 1972

Inventor(s) CORNELIO CALDO

It is certified that error appears in the above-identified patent and that said Letters Patent are hereby corrected as shown below:

Column 1, in the second structural formula, line 59, that portion of the formula reading:

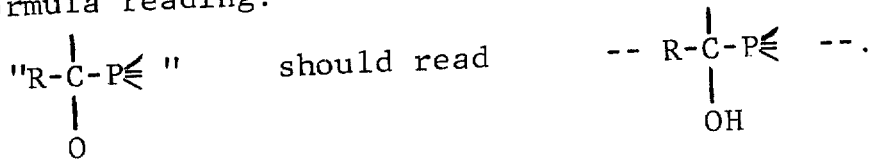

Column 2, line 4: "effcacy" should read -- efficacy --. Column 3, line 7: "styrene/benzolacetone" should read -- styrene/benzalacetone --; line 49: "having with a" should read -- having a --; line 56: "4-methyl pentene-1," should read -- 4-methyl-pentene-1, --. Column 4, line 45: "wahing" should read -- washing --; line 49: "No. 1,609,651" should read -- No. 1,069,651 --. Column 6, line 55: "derivatives" should read -- derivative --. Column 8, line 59: "benzalecetophenone" should read -- benzalacetophenone --.

Signed and sealed this 21st day of November 1972.

(SEAL)
Attest:

EDWARD M. FLETCHER, JR.
Attesting Officer

ROBERT GOTTSCHALK
Commissioner of Patent

PR